(12) United States Patent
Hoemske (10) Patent No.: US 11,981,070 B2
(45) Date of Patent: May 14, 2024

(54) 3D PRINTED ULTRASONIC PROBE (71) Applicant: Baker Hughes Holdings LLC, Houston, TX (US)

(72) Inventor: Benjamin Hoemske, Hurth (DE)

(73) Assignee: Baker Hughes Holdings LLC, Houston, TX (US)

( * ) Notice: Subject to any disclaimer, the term of this patent is extended or adjusted under 35 U.S.C. 154(b) by 0 days.

(21) Appl. No.: 17/805,106

(22) Filed: Jun. 2, 2022

(65) Prior Publication Data

US 2022/0402200 A1 Dec. 22, 2022

Related U.S. Application Data (60) Provisional application No. 63/211,540, filed on Jun. 16, 2021.

(51) Int. Cl.
*B29C 64/135* (2017.01)
*B29C 64/245* (2017.01)
*B33Y 10/00* (2015.01)
*B33Y 70/00* (2020.01)
*B33Y 80/00* (2015.01)

(52) U.S. Cl.
CPC .......... *B29C 64/135* (2017.08); *B29C 64/245* (2017.08); *B29K 2995/0001* (2013.01); *B33Y 10/00* (2014.12); *B33Y 70/00* (2014.12); *B33Y 80/00* (2014.12)

(58) Field of Classification Search
None
See application file for complete search history.

(56) References Cited

U.S. PATENT DOCUMENTS 5,143,663 A * 9/1992 Leyden .................. B33Y 40/20
  34/189
2021/0046507 A1 * 2/2021 Chen ...................... H10N 30/88

* cited by examiner

*Primary Examiner* — Mohammad M Ameen
(74) *Attorney, Agent, or Firm* — Mintz, Levin, Cohn, Ferris, Glovsky and Popeo, P.C.

(57) ABSTRACT

An ultrasonic probe and methods of manufacture are provided. The method can include depositing a base layer on a platform. The method can also include depositing a first portion of a first functional layer on the base layer. The method can further include positioning a first surface of an ultrasonic transducer on the first portion of the first functional layer. The transducer can further include a second surface opposite the first surface and opposed first and second sides. The first and second sides can be transverse to the first and second surfaces. The method can additionally include depositing a second portion of the first functional layer on the first and second sides of the transducer. The method can further include depositing a second functional layer upon the second surface of the transducer. The transducer can be encapsulated by the first functional layer and the second functional layer.

14 Claims, 11 Drawing Sheets

ID ULTRASONIC PROBE

CROSS-REFERENCE TO RELATED APPLICATIONS

This application claims priority to U.S. Provisional Patent Application No. 63/211,540 filed Jun. 16, 2021 and entitled "3D PRINTED ULTRASONIC PROBE," the entire contents of which is hereby expressly incorporated by reference herein.

TECHNICAL FIELD

The present disclosure relates generally to an ultrasonic probe and a method of manufacturing an ultrasonic probe, and more particularly to a 3D printed ultrasonic probe and methods for manufacturing an ultrasonic probe using additive manufacturing, such as 3D printing.

BACKGROUND

In some instances, non-destructive testing (NDT) is a class of analytical techniques that can be used to inspect characteristics of a target, without causing damage, to ensure that the inspected characteristics satisfy required specifications. For this reason, NDT can be used in a number of industries such as aerospace, power generation, oil and gas transport or refining. NDT can be useful in industries that employ structures that are not easily removed from their surroundings (e.g., pipes or welds) or where failures would be catastrophic.

Ultrasonic testing is one type of NDT. Ultrasound is acoustic (sound) energy in the form of waves that have an intensity (strength) which varies in time at a frequency above the human hearing range. In ultrasonic testing, one or more ultrasonic waves can be generated by an ultrasonic source (e.g., an ultrasonic transducer) and directed towards a target in an initial pulse. As the ultrasonic waves contact and penetrate the target, they can reflect from features such as outer surfaces and interior defects (e.g., cracks, porosity, etc.). An ultrasonic sensor can acquire ultrasonic measurements, such as acoustic strength as a function of time, that include these reflected ultrasonic waves.

SUMMARY

In general, an ultrasonic testing device can include an ultrasonic probe having a housing in which the ultrasonic source (e.g., an ultrasonic transducer) is positioned, amongst other components. The design of such ultrasonic probes can be formed from multiple components that are assembled around the ultrasonic source to form the completed ultrasonic probe. It can be appreciated that such assemblies can require significant manual labor and time to complete. Furthermore, manual assembly can inherently introduce variations in the completed ultrasonic probe.

Accordingly, an improved ultrasonic probe and methods of manufacture are provided. As discussed in detail below, in one embodiment the ultrasonic probe is formed by additive manufacturing (e.g., 3D printing such as stereolithography). Certain layers (e.g., functional layers) are deposited directly upon the ultrasonic transducer. Other layers (e.g., protective housing, etc.) are deposited on the functional layers. In this manner, the ultrasonic probe is formed around the ultrasonic transducer. Use of a manufacturing technique such as stereolithography can fully encapsulate the ultrasonic transducer within the ultrasonic probe. In this manner, the amount of manual assembly, and attendant manufacturing variations, can be reduced.

In one embodiment, a method of manufacturing an ultrasonic probe is provided. The method can include depositing a base layer on a platform. The method can also include depositing a first portion of a first functional layer on the base layer. The method can further include positioning a first surface of an ultrasonic transducer on the first portion of the first functional layer. The ultrasonic transducer can further include a second surface opposite the first surface and opposed first and second sides. The first and second sides can be transverse to the first and second surfaces. The method can additionally include depositing a second portion of the first functional layer on the first and second sides of the ultrasonic transducer. The method can further include depositing a second functional layer upon the second surface of the ultrasonic transducer. The ultrasonic transducer can be encapsulated by the first functional layer and the second functional layer.

In some embodiments, depositing the base layer can include: submerging the platform within a tank containing a liquid resin of a base material, focusing a first light beam within a volume of the base material resin adjacent to a surface of the platform, and curing the volume of base material resin in response to exposure to the first light beam to form the base layer.

In some embodiments, depositing the first portion of the first functional layer can include submerging the platform and the base layer within the tank containing a liquid resin of a first functional material, focusing a second light beam within a first volume of the first functional material adjacent to a surface of the base layer, and curing the first volume of the first functional material resin in response to exposure to second light beam to form the first portion of the first functional layer.

In some embodiments, depositing the second portion of the first functional layer can include submerging the platform, the base layer, the ultrasonic transducer, and the first portion of the first functional layer within the tank containing a liquid resin of the first functional material, focusing the second light beam within a second volume of the first functional material adjacent to the first and second sides of the transducer, and curing the second volume of the first functional material resin in response to exposure to the second light beam to form the second portion of the first functional layer.

In some embodiments, depositing the second functional layer can include submerging the platform, the base layer, the ultrasonic transducer, and the first and second portions of the first functional layer within the tank containing a liquid resin of the second functional material, focusing a third light beam within a third volume of the second functional material adjacent to the second surface of the transducer, curing the third volume of the second functional material resin in response to exposure to the fourth light beam to form the second functional layer on the second surface of the transducer.

In some embodiments, the method can further include depositing a first portion of a housing on at least a portion of free surfaces of the base layer, the ultrasonic transducer, and the first and second functional layers.

In some embodiments, depositing a first housing portion can include submerging the platform, the base layer, the ultrasonic transducer, and the first and second portions of the first functional layer within the tank containing a liquid resin of a housing material, focusing a fourth light beam within a first volume of the housing material adjacent to at least a portion of free surfaces of the base layer, the ultrasonic transducer, and the first and second functional layers, and curing the first volume of the housing material in response to exposure to the fourth light beam to form the first housing portion.

In some embodiments, the method can further include positioning a printed circuit board (PCB) on the second functional layer, and electrically connecting the PCB to the ultrasonic transducer.

In some embodiments, the method can further include depositing a second housing portion on at least a portion of the base layer, the first and second functional layers, the transducer, the first housing portion, and the PCB.

In some embodiments, depositing the second housing portion can further include submerging the platform, the base layer, the ultrasonic transducer, the first and second functional layers, the PCB, and the first housing portion within the tank containing the liquid resin of the housing material, focusing the fourth light beam within a second volume of the housing material resin adjacent to free surfaces of the base layer, the ultrasonic transducer, the first and second functional layers, the PCB, and the first housing portion, and curing the housing material resin in response to exposure to the fourth light to form the second housing portion.

In some embodiments, the PCB can be encapsulated by the first housing portion and the second housing portion.

In some embodiments, the first functional material can include an acoustic matching material configured to provide acoustic impedance matching between the ultrasonic transducer and a target.

In some embodiments, the second functional material can include a damping material configured to attenuate ultrasonic signals emitted by the ultrasonic transducer by a predetermined amount.

In some embodiments, electrically connecting the PCB to the ultrasonic transducer can include depositing one or more electrically conductive pathways between the ultrasonic transducer and the PCB prior to depositing the second housing portion.

In another embodiment, an ultrasonic probe is provided. The ultrasonic probe can include an ultrasonic transducer, a first functional material in contact with a first portion of the ultrasonic transducer; and a second functional material in contact with a second portion of the ultrasonic transducer. The ultrasonic transducer can be encapsulated by the first functional material and the second functional material.

In some embodiments, the ultrasonic probe can include a printed circuit board in electrical communication with the ultrasonic transducer and positioned on a surface of the second functional material. In other embodiments, the printed circuit board can include one or more electrically conductive pathways deposited on the second functional material between the ultrasonic transducer and the printed circuit board.

The first functional material and second functional material can have a variety of configurations. For example, in some embodiments, the first functional material can include an acoustic matching material configured to provide acoustic impedance matching between the ultrasonic transducer and a target. In some embodiments, the second functional material can include a damping material configured to attenuate ultrasonic signals emitted by the ultrasonic transducer by a predetermined amount. In certain embodiments, the first functional material and the second functional material can be light-cured resin.

DESCRIPTION OF DRAWINGS

These and other features will be more readily understood from the following detailed description taken in conjunction with the accompanying drawings, in which.

It is noted that the drawings are not necessarily to scale. The drawings are intended to depict only typical aspects of the subject matter disclosed herein, and therefore should not be considered as limiting the scope of the disclosure.

DETAILED DESCRIPTION

Ultrasonic testing systems can include an ultrasonic probe that emits and receives ultrasonic signals for evaluation of a target. As an example, the ultrasonic source (e.g., an ultrasonic transducer) can be positioned inside a protective housing, along with other electrical components. Such ultrasonic probes can be assembled from multiple, pre-fabricated components around the ultrasonic source to form the completed ultrasonic probe. However, such assemblies can require significant manual labor and time to complete, and can exhibit variations due to differences in manual assembly. To address these problems, an improved method for manufacturing ultrasonic probes is provided. As discussed in detail below, the ultrasonic probe can be formed by 3D printing (e.g., stereolithography) in a layer-by-layer manner. Certain layers (e.g., functional layers) can be deposited directly upon the ultrasonic transducer. Other layers (e.g., protective housing, etc.) can be deposited on the functional layers, and optionally a portion of the ultrasonic transducer (e.g., one or more sides). That is, the ultrasonic probe can be formed around the ultrasonic transducer, rather than assembled from pre-fabricated components. Beneficially, manufacturing the ultrasonic probe in this manner can fully encapsulate the ultrasonic transducer, reducing the amount of manual assembly and attendant manufacturing variations.

Embodiments of the present disclosure discuss fabrication of ultrasonic probes by stereolithography apparatus (SLA). However, alternative embodiments of the ultrasonic probes can fabricated by other additive manufacturing processes without limit.

Figure 1:
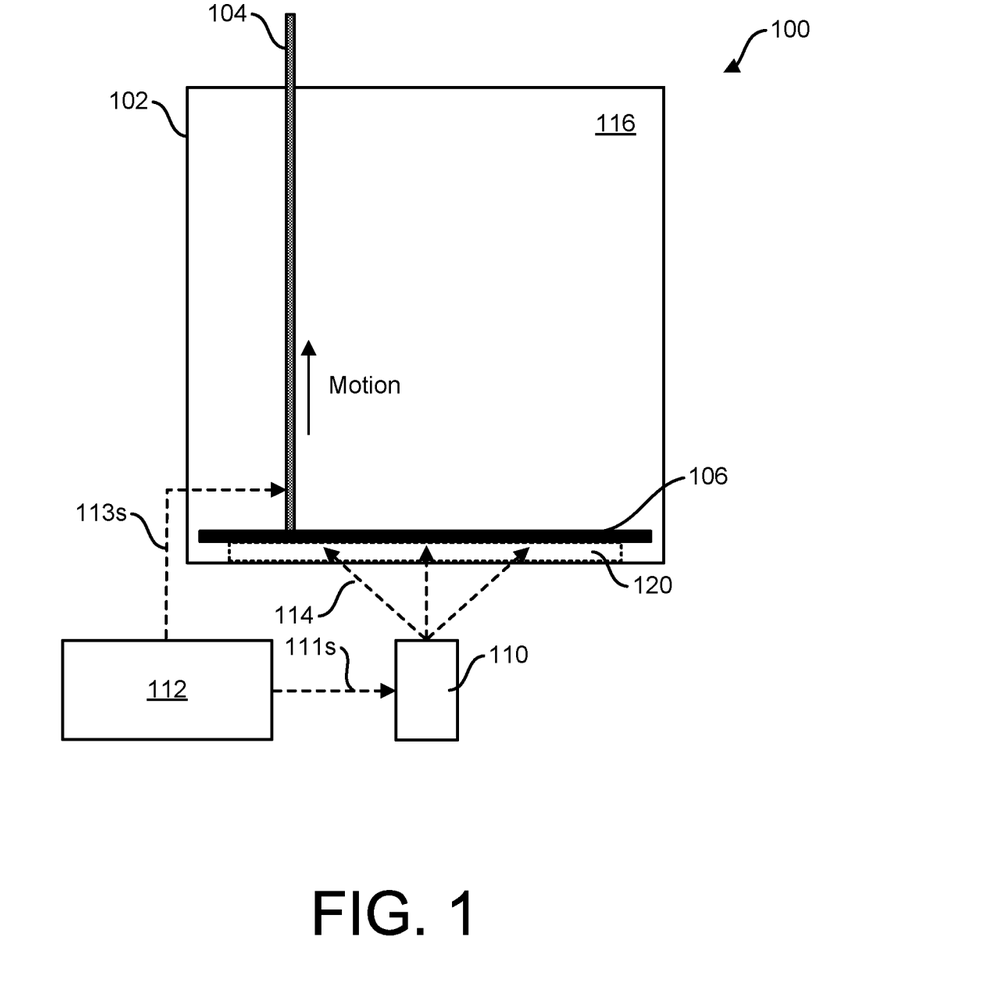
FIG. 1 is a diagram illustrating one embodiment of a stereolithography apparatus (SLA)

FIG. 1 is a diagram illustrating one aspect of a stereolithography apparatus (SLA) 100 that can be employed to form an ultrasonic probe by additive manufacturing (3D printing). As shown, the SLA 100 includes a tank 102, an actuator 104, a moveable platform 106, a light source 110, and a controller 112. The actuator 104 and the light source 110 can each be in signal communication with the controller 112.

The light source 110 can be configured to emit one or more light beams 114. In one aspect, light source 110 can include an optical arrangement (not shown) including one or more lenses for focusing and/or scanning the one or more light beams 114. The controller 112 can command the light source 110 to emit the one or more light beams 114 having predetermined operating parameters. Such operating parameters can include, but are not limited to, one or more of wavelength, intensity, power, focal length, spot size (e.g., diameter), dwell time, etc. In one aspect, the light source can be a laser.

The actuator 104 is coupled to the moveable platform 106 and can be configured to move the platform (e.g., upwards/downwards) in response to receipt of command signals 113s from the controller 112. The command signals 113s can specify the speed and direction of motion of the moveable platform 106.

In operation, the tank 102 is filled with a curable resin 116. The controller 112 transmits the command signals 111s to the light source 110 to emit the one or more light beams 114s focused within a target volume 120 of the curable resin 116 (e.g., a volume adjacent to the moveable platform 106). The operating parameters of the one or more light beams 114 are configured to cause cross-linking (curing) of the curable resin 116 and deposition of a layer of solidified resin on the moveable platform 106. Concurrently, the controller 112 can further transmit command signals 113s to the actuator to move the moveable platform 106 in the direction away from the light source 110. This motion allows the curable resin 116 to flow adjacent to the solidified resin layer. The sequence of exposing the curable resin 116 to the one or more light beams 114 and moving the moveable platform 106 can be repeated to build up a structure of predetermined dimensions layer by layer.

Embodiments of the stereolithography apparatus 100 can be employed to fabricate an ultrasonic probe. As discussed in detail below, an ultrasonic transducer can be fully encapsulated within layers of cured resin formed using SLA. The layers can adopt a variety of configurations. In one aspect, a portion of the layers on the side of the ultrasonic transducer facing a desired (forward) direction of ultrasonic signal transmission can be acoustic matching layers. The acoustic matching layers can be configured to reduce attenuation of ultrasonic beams in the forward direction. In one aspect, a portion of the layers on an opposite surface of the transducer (e.g., facing a rearward direction) can be damping layers. The damping layers can be configured to prevent backward emitted ultrasonic signals from returning to the ultrasonic probe for detection. In one aspect, the layers can be configured to provide selected mechanical properties (e.g., strength, stiffness, fracture resistance, etc.) for protection of components within the ultrasonic probe.

It can be appreciated that embodiments of the additive manufacturing processes discussed herein for manufacture of ultrasonic probes are different than existing approaches. Notably, the layers of cured resin (e.g., functional layers) can be deposited directly on the transducer. This is in contrast to existing approaches that can employ additive manufacturing to form portions of an ultrasonic probe separately and subsequently assembling the components together, positioning the ultrasonic transducer within a cavity therein. Depositing material directly on the ultrasonic transducer can avoid time consuming manual assembly. Furthermore, by reducing the amount of manual assembly, manufacturing variations can be reduced. In further aspects, functional layers can be tailored to their intended application.

Figure 2:
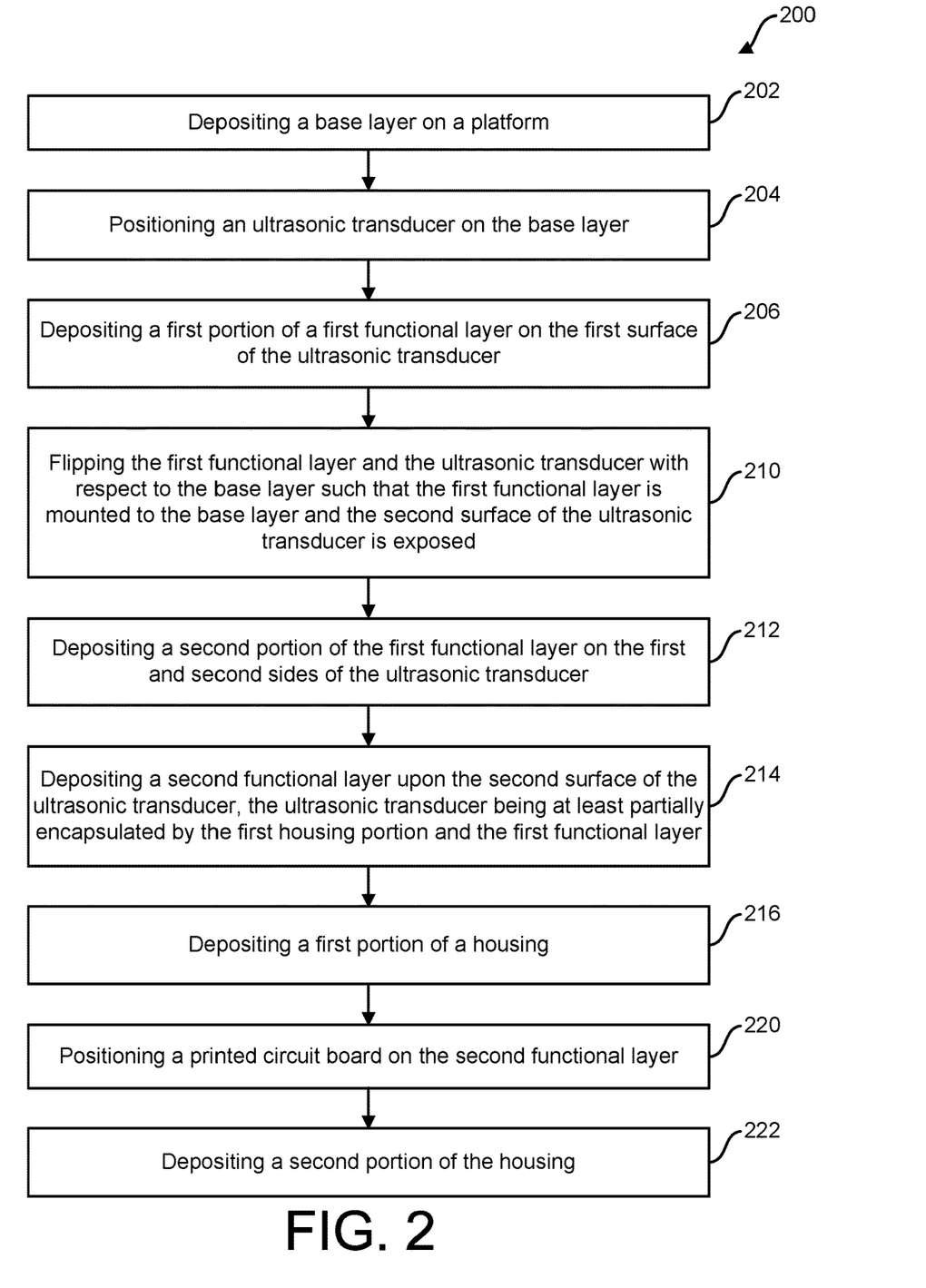
FIG. 2 is flow diagram illustrating another embodiment of a method of forming an ultrasonic probe by three-dimensional (3D) deposition.

FIG. 2 is a flow diagram illustrating one aspect of a method 200 of manufacturing an ultrasonic probe that can be performed by the stereolithography apparatus 100. As shown, the method 200 includes operations 202-222, discussed in detail below with regards to FIGS. 3A-12. However, it can be appreciated that in alternative embodiments one or more of the illustrated operations can be omitted or performed in a different order than shown.

Figure 3A:
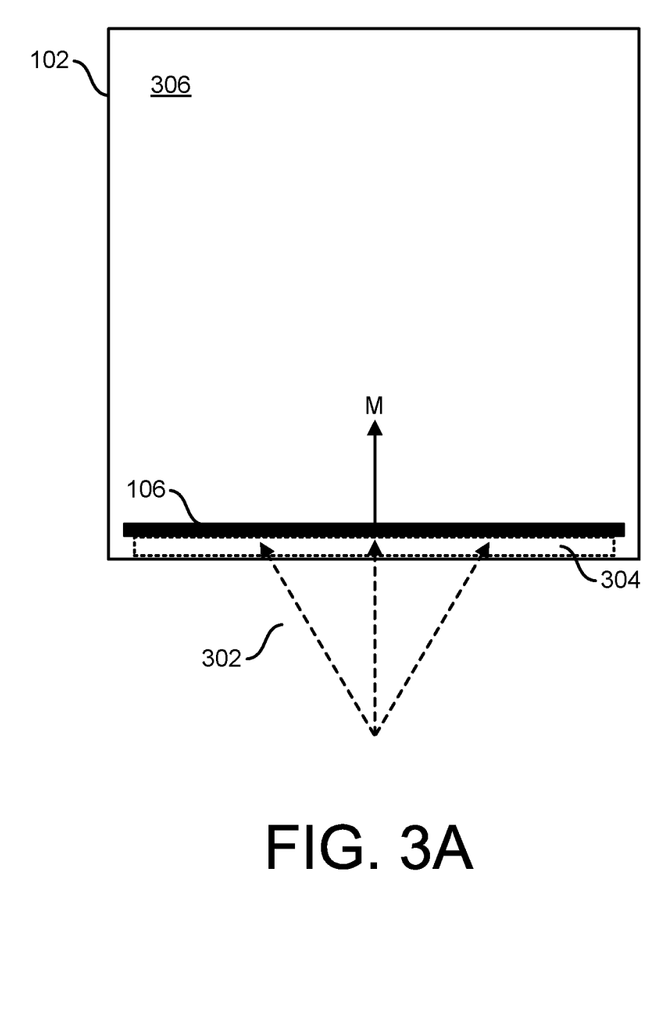
FIG. 3A is a schematic diagram illustrating exposure of a base material resin to a first light of the stereolithography apparatus of FIG. 1.
Figure 3B:
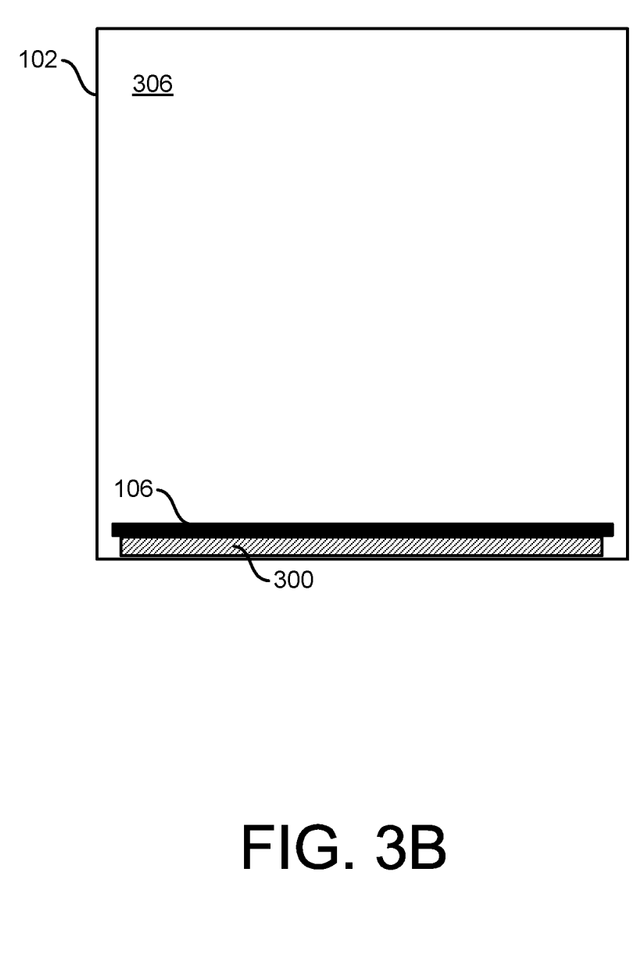
FIG. 3B is a schematic diagram illustrating deposition of a base layer formed by curing of the exposed base material resin.

In operation 202, a base layer 300 can be deposited on the platform 106. FIGS. 3A-3B illustrate one aspect of this deposition. As shown, the platform 106 can be submerged within the tank 102 containing a base material resin 306 in a liquid state, and a first light beam 302 can be focused within a target volume 304 of the base material resin 306. As an example, the target volume 304 can be adjacent to or in contact with a surface of the platform 106. The first light beam 302 (e.g., a laser beam) can be configured to cure (e.g., cross-link) the base material resin 306 in response to exposure. The platform 106 can be moved (e.g., in the upwards direction, arrow M) concurrently with or after curing to form the base layer 300 in a solid state.

Figure 4:
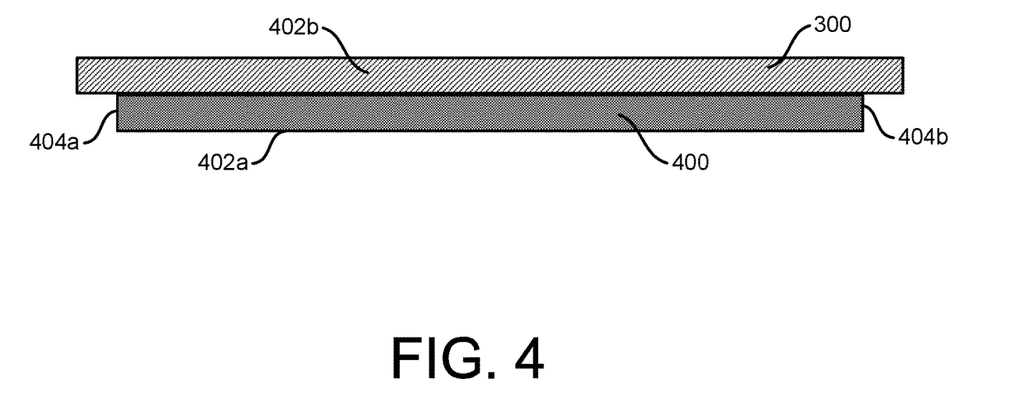
FIG. 4 is a schematic diagram illustrating mounting of a transducer to a surface of the base layer.

In operation 204, a transducer 400 can be positioned on the base layer 300. As illustrated in FIG. 4, the transducer 400 can include opposed first and second surfaces 402a, 402b (e.g., top and bottom surfaces) and opposed first and second sides 404a, 404b (e.g., left and right sides). The first and second sides 400a, 400b can be transverse to the first and second surfaces 402a, 402b. The second surface 402b of the transducer 400 is further shown as being positioned in contact with the base layer 300. So configured, the first surface 402a of the transducer 400 is a free surface. However, in alternative aspects, the first surface can be in contact with the base layer. In certain aspects, an adhesive or other removable fixation agent can be employed to maintain the transducer 400 in place with respect to the base layer 300 during the deposition process.

Figure 5A:
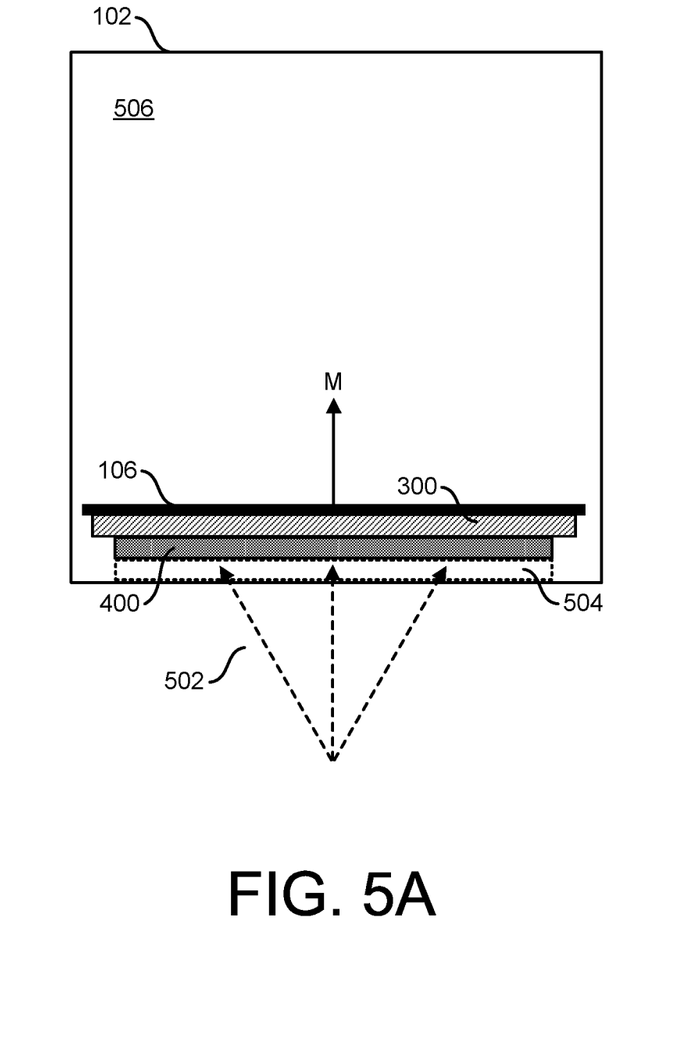
FIG. 5A is a schematic diagram illustrating exposure of a first functional material resin to a second light of the stereolithography apparatus of FIG. 1.
Figure 5B:
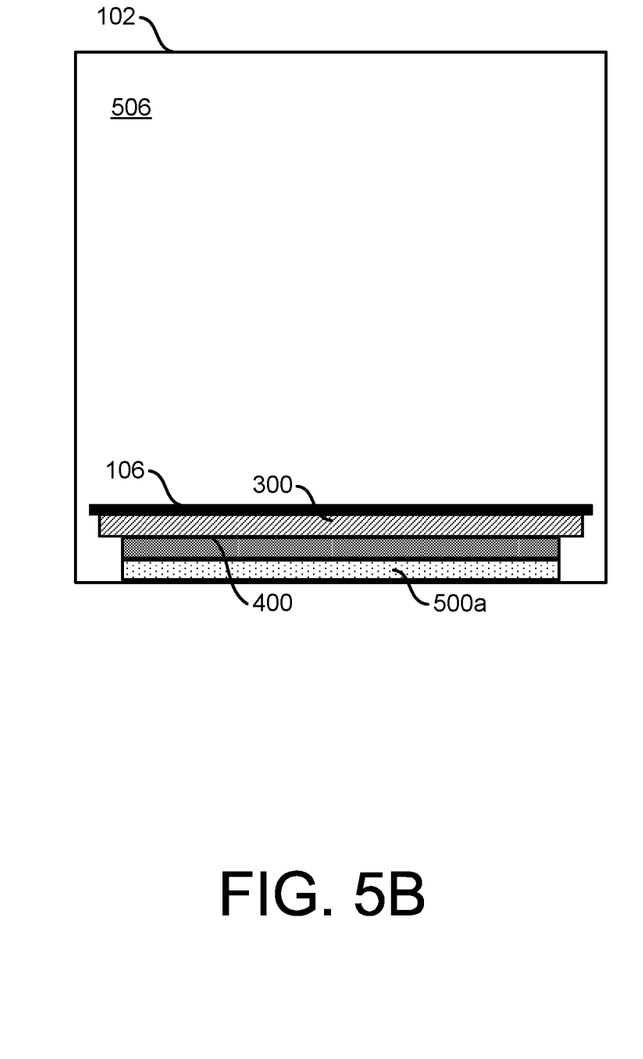
FIG. 5B is a schematic diagram illustrating a first portion of a first functional layer formed by curing of the exposed first functional material resin.

In operation 206, a first portion of a first functional layer 500*a* can be deposited on the base layer 300. FIGS. 5A-5B illustrate one aspect of this deposition. As shown, the platform 106 having the base layer 300 and transducer 400 mounted thereon can be submerged within the tank 102 containing a first functional material resin 506 in a liquid state. A second light beam 502 can be focused within a target volume 504 of the base material resin 306. As an example, the target volume 504 can be adjacent to or in contact with a surface of the transducer 400 (e.g., the first surface 402*a*).

The second light beam 502 (e.g., a laser beam) can be configured to cure (e.g., cross-link) the first functional material resin 506 in response to exposure. The second light beam 502 can be the same or different from the first light beam 302. The platform 106 can be moved (e.g., in the upwards direction, arrow M) concurrently with or after curing to form the first portion of the first functional layer 502*b* in a solid state.

The first functional layer can adopt a variety of configurations. As discussed above, in certain aspects, the first functional layer can be formed from a matching material configured to provide acoustic impedance matching between the ultrasonic transducer 400 and a target. However, in alternative embodiments, the first functional layer can adopt other functionality as necessary.

Figure 6A:
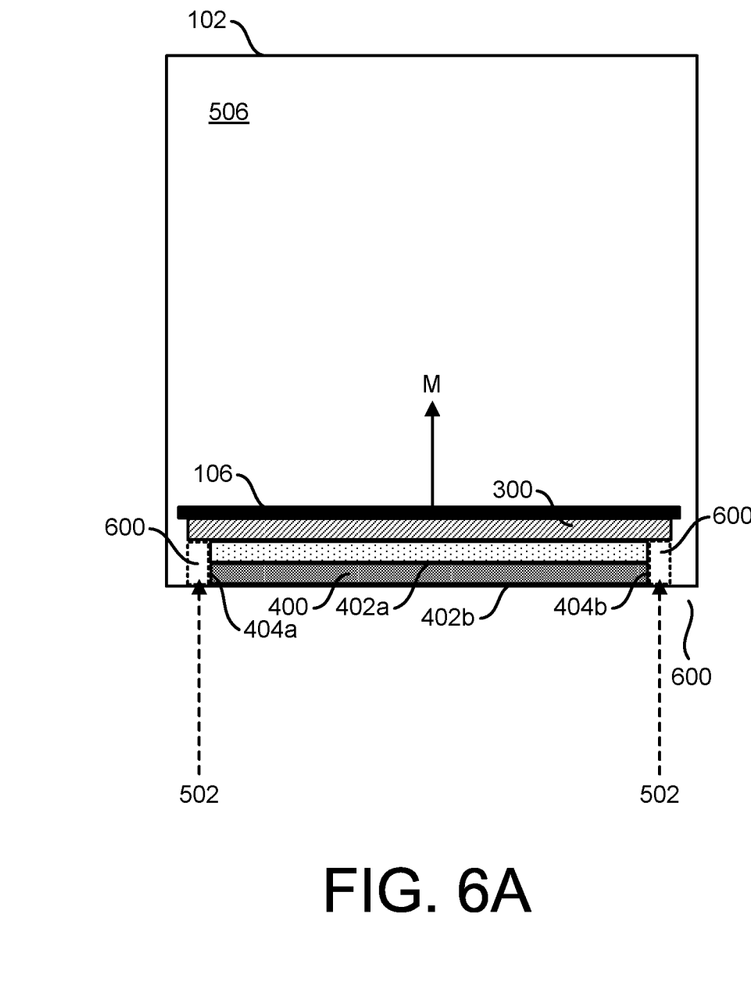
FIG. 6A is a schematic diagram illustrating exposure of the functional material resin to the second light of the stereolithography apparatus of FIG. 1.

In operation 210, the first portion of the first functional layer 500*a* and the ultrasonic transducer 400 can be flipped with respect to the base layer 300, as illustrated in FIG. 6A. The first functional layer 500*a* can be further positioned in contact with and secured to the base layer 300 (e.g., by an adhesive or other fixation agent). The second surface 402*b* of the ultrasonic transducer 400 can be further exposed.

Figure 6B:
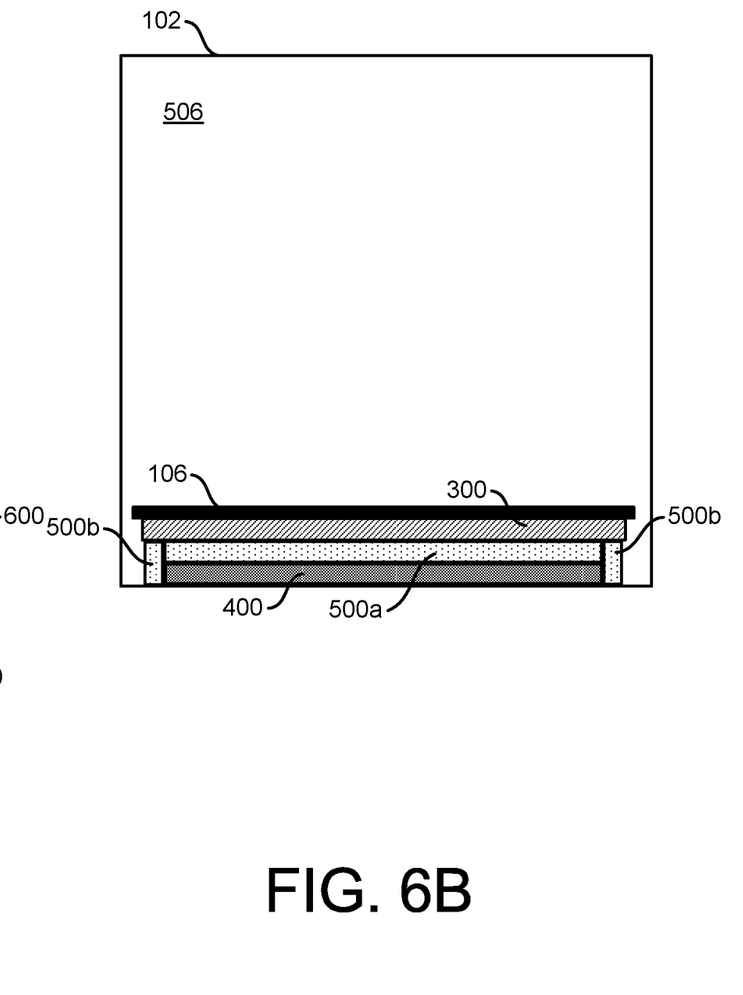
FIG. 6B is a schematic diagram illustrating a second portion of a first functional layer formed by curing of the exposed first functional material resin.

In operation 212, a second portion of a first functional layer 500*b* can be deposited on the ultrasonic transducer 400 (e.g., the second surface 402*b*). FIGS. 6A-6B illustrate one aspect of this deposition. As shown, the platform 106 having the base layer 300, the transducer 400, and the first portion of the first functional layer 502*a* mounted thereon can be submerged within the tank 102 containing the first functional material resin 506 in a liquid state. The second light beam 502 can be focused within a target volume 600 of the base material resin 306. As an example, the target volume 600 can be adjacent to or in contact with lateral sides of the transducer 400 (e.g., the first and second sides 404*a*, 404*b*).

The second light beam 502 (e.g., a laser beam) can be configured to cure (e.g., cross-link) the first functional material resin 506 in response to exposure. The platform 106 can be moved (e.g., in the upwards direction, arrow M) concurrently with or after curing to form the second portion of the first functional layer 502*b* in a solid state.

Figure 7A:
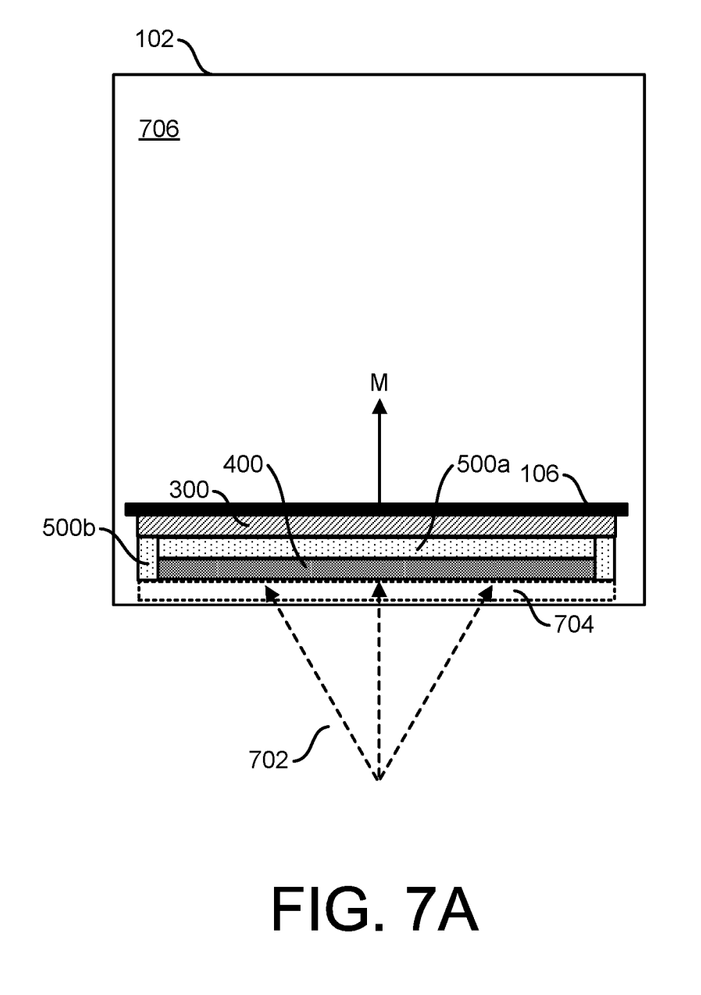
FIG. 7A is a schematic diagram illustrating exposure of a second functional material resin to a third light of the stereolithography apparatus of FIG. 1.
Figure 7B:
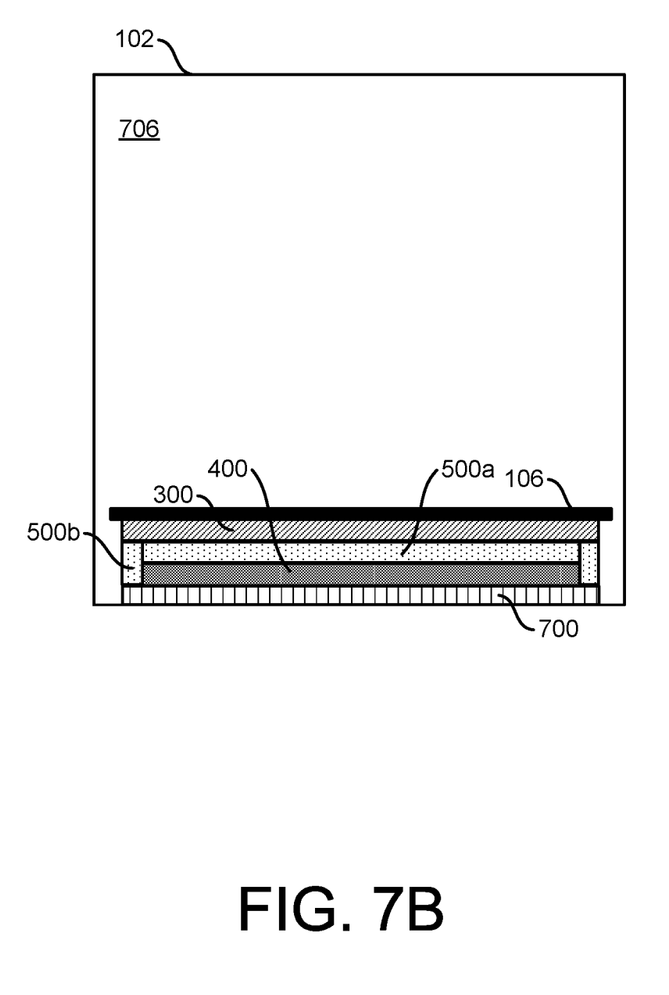
FIG. 7B is a schematic diagram illustrating a second functional layer formed after curing of the exposed second functional material resin.

In operation 214, a second functional layer 700 can be deposited on at least the ultrasonic transducer 400 (e.g., on the second surface 402). FIGS. 7A-7B illustrate one aspect of this deposition. As shown, the platform 106 having the base layer 300, the first and second portions of the first functional layer 500*a*, 500*b* (collectively first functional layer 500), and the transducer 400 can be submerged within the tank 102 containing a second functional material resin 706 in a liquid state. A third light beam 702 can be focused within a target volume 704 of the second functional material resin 706. As an example, the target volume 704 can be adjacent to or in contact with a surface of the transducer 400 (e.g., the second surface 402*b*).

The third light beam 702 (e.g., a laser beam) can be configured to cure (e.g., cross-link) the second functional material resin 706 in response to exposure. The third light beam 702 can be the same or different from the first light beam 302 and the second light beam 502. The platform 106 can be moved (e.g., in the upwards direction, arrow M) concurrently with or after curing to form the second functional layer 700 in a solid state. It can be observed that the first and second portions of the first functional layer (500*a*, 500*b*, collectively first functional layer 500) and second functional layer 700 surround at least a portion of the ultrasonic transducer 400. In certain aspects, the first and second functional layers 500, 700 can partially or fully encapsulate the ultrasonic transducer 400.

The second functional layer 700 can adopt a variety of configurations. As discussed above, in certain aspects, the second functional layer 700 can be a damping layer configured to provide a predetermined amount of damping (attenuation) of ultrasonic signals emitted by the ultrasonic transducer 400. However, in other aspects, the second functional layer can adopt other functionality as necessary.

Figure 8:
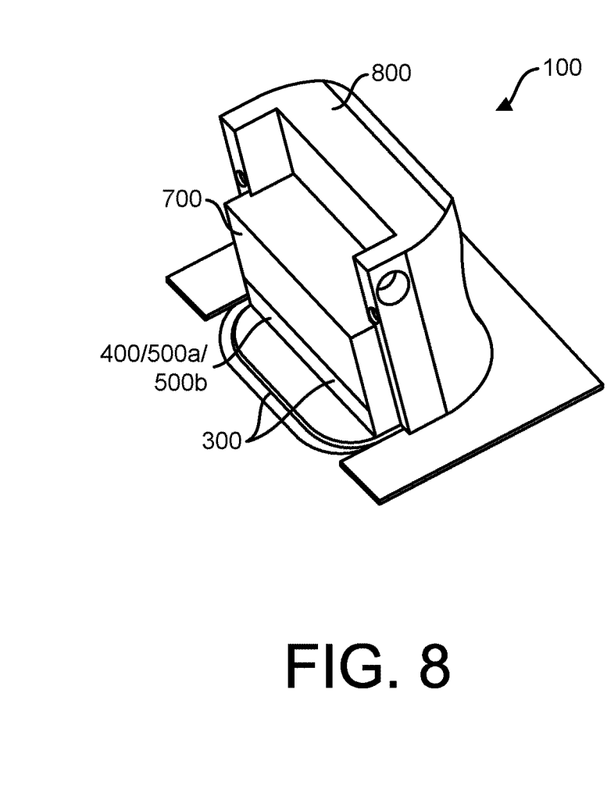
FIG. 8 is an isometric view of a schematic illustration of a portion of an ultrasonic probe formed by the stereolithography apparatus of FIG. 1.
Figure 11A:
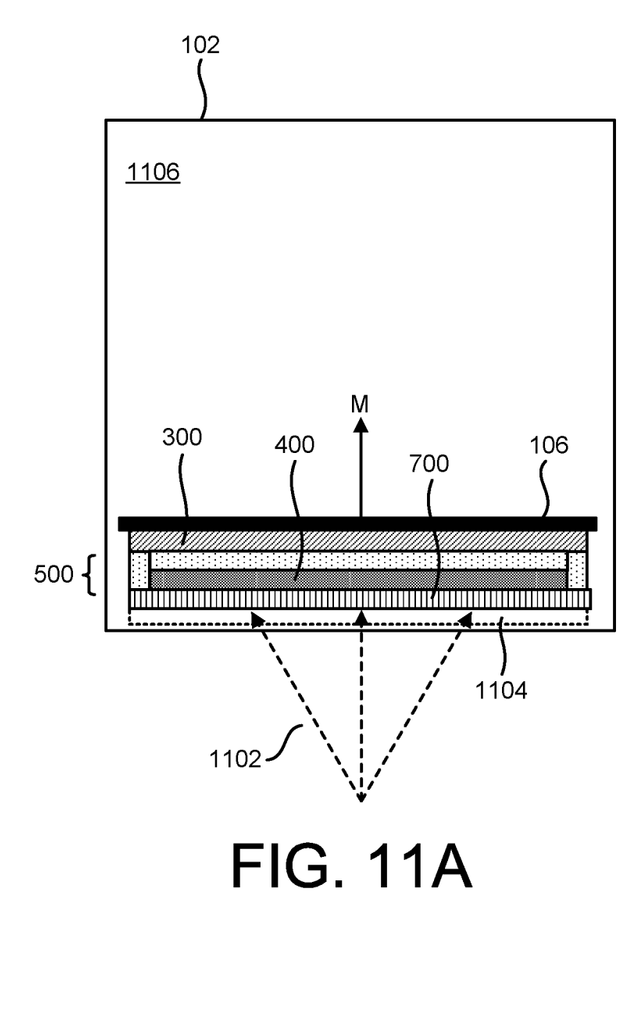
FIG. 11A is a schematic diagram illustrating exposure of a housing material resin to the fourth light of the stereolithography apparatus of FIG. 1.
Figure 11B:
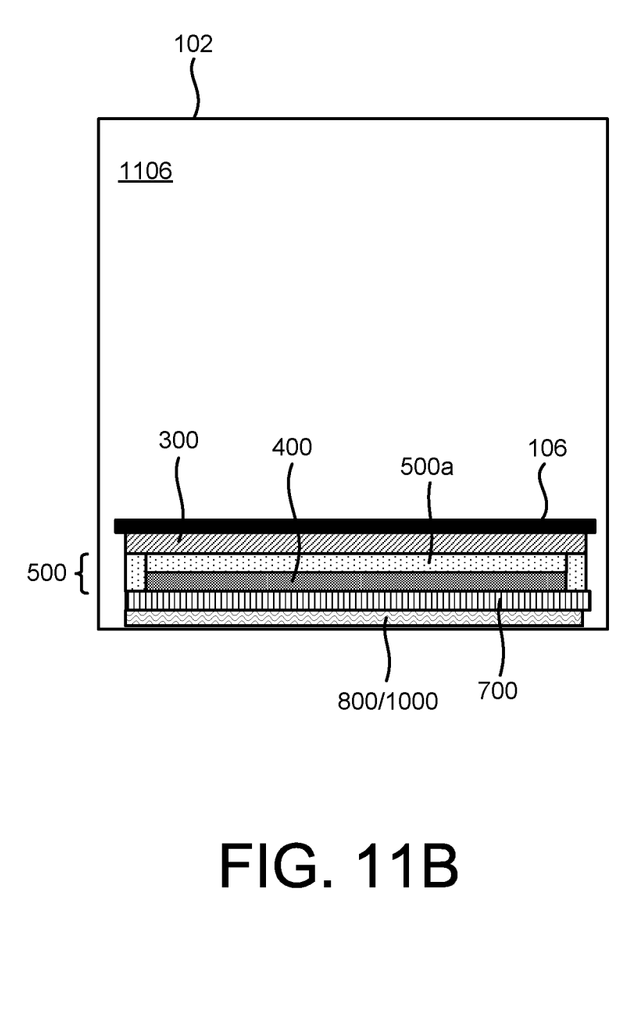
FIG. 11B is a schematic diagram illustrating the second housing portion formed by curing of the exposed housing material resin.

In operation 216, a first portion of a housing 800 can be deposited. As shown in FIG. 8, the first housing portion 800 can be deposited on at least a portion of free surfaces of the base layer 300, the ultrasonic transducer 400, and the first and second functional layers 500, 700. The deposition process is further illustrated in FIGS. 11A-11B illustrate one aspect of this deposition. As shown, the platform 106 having the base layer 300, the transducer 400, and first and second functional layers 500, 700, and the transducer 400 can be submerged within the tank 102 containing a housing material resin 1106 in a liquid state. A fourth light beam 1102 can be focused within a target volume 1104 of the housing material resin 1106. As an example, the target volume 1104 can be adjacent to or in contact with a portion of free surfaces of the base layer 300, the transducer 400, and first and second functional layers 500, 700.

The fourth light beam 1102 (e.g., a laser beam) can be configured to cure (e.g., cross-link) the housing material resin 1106 in response to exposure. The fourth light beam 1102 can be the same or different from the first light beam 302, the second light beam 502, and the third light beam 702. The platform 106 can be moved (e.g., in the upwards direction, arrow M) concurrently with or after curing to form the first housing portion 800 in a solid state.

Figure 12:
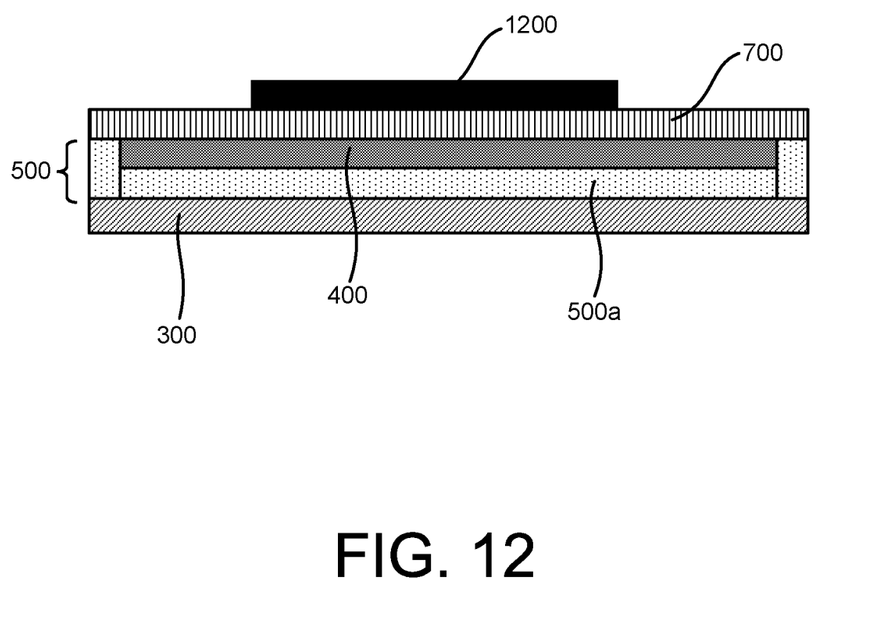
FIG. 12 is a schematic diagram illustrating positioning of the printed circuit board (PCB) on the second functional layer.

In operation 220, a printed circuit board (PCB) 1200 can be positioned on the second functional layer 700, as illustrated in FIG. 12. A top-down isometric view is further illustrated in FIG. 9. The PCB 1200 can also be placed in electrical communication with at least the transducer 400 via conductive traces 900 (e.g., wires). The conductive traces 900 can extend from the PCB 1200 to the ultrasonic transducer 400, through the second functional layer 700. In certain aspects, the conductive traces 900 can be formed concurrently with the second functional layer 700.

Figures 9, 10:
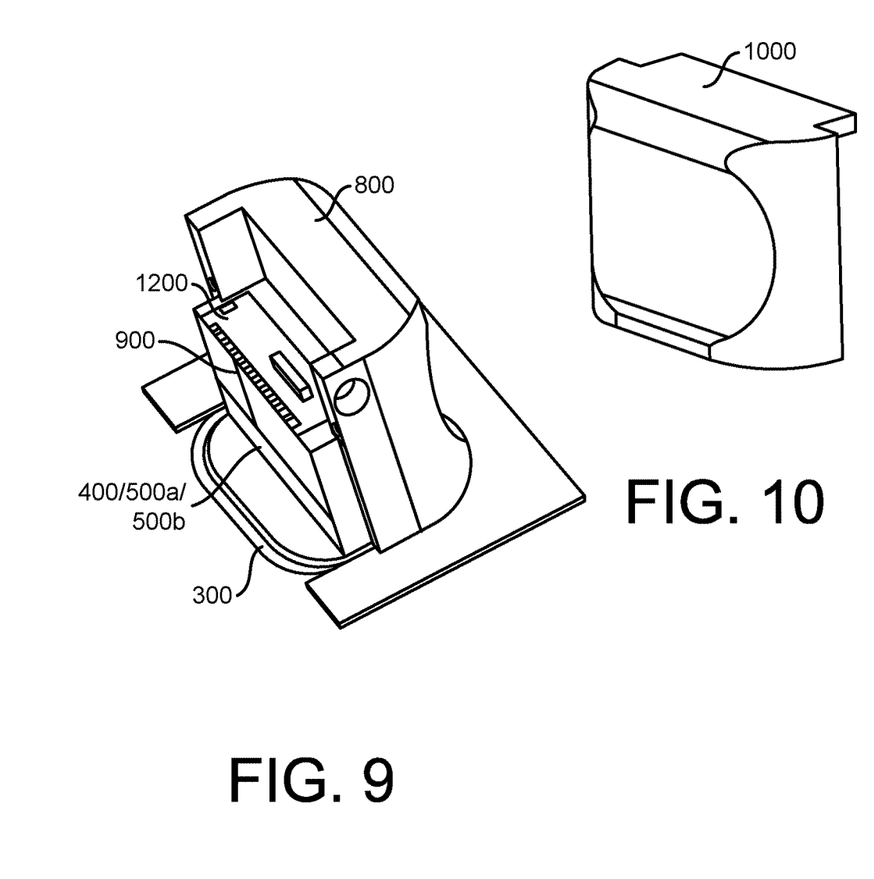
FIG. 9 is an isometric view illustrating the portion of the ultrasonic probe of FIG. 8 after a printed circuit board (PCB) is positioned thereon.
FIG. 10 is an isometric view of a schematic illustration of a portion of a housing deposited on the portion of the ultrasonic probe of FIG. 9.

In operation 222, a second portion of the housing 1000 can be deposited. The second housing portion 1000 is shown in isolation for clarity. However, it can be understood that the second housing portion 1000 can be deposited on at least a portion of free surfaces of the base layer 300, the ultrasonic transducer 400, the first and second functional layers, the PCB 1200, and the first housing portion 800. The deposition process is similar to that illustrated in FIGS. 11A-11B, as discussed above. The platform 106 having the base layer 300, the transducer 400, and first and second functional layers 500, 700, the transducer 400, and the first housing portion 800 can be submerged within the tank 102 containing the housing material resin 1106 in a liquid state. The fourth light beam 1102 can be focused within a target volume 1104 of the housing material resin 1106. As an example, the target volume 1104 can be adjacent to or in contact with a portion of free surfaces of the base layer 300, the transducer 400, first and second functional layers 500, 700, the PCB 1200, and the first housing portion 800.

The fourth light beam 1102 (e.g., a laser beam) can be configured to cure (e.g., cross-link) the housing material resin 1106 in response to exposure. The fourth light beam 1102 can be the same or different from the first light beam 302, the second light beam 502, and the third light beam 702. The platform 106 can be moved (e.g., in the upwards direction, arrow M) concurrently with or after curing to form the second housing portion 1000 in a solid state. Under circumstances where the transducer 400 is not fully encapsulated by the first and second functional layers 500, 700, the transducer 400 can be fully encapsulated by a combination of the first and second functional layers 500, 700 and the first and second housing portions 800, 1000.

The first and second housing portions 800, 1000 can adopt a variety of configurations. In certain aspects, the first and second housing portions 800, 1000 can be configured to protect the transducer, PCB, and other components positioned inside the ultrasonic probe from damage. Accordingly, the first and second housing portions 800, 1000 can exhibit one or more mechanical properties (e.g., tensile strength, compressive strength, fracture resistance, elastic modulus, etc.) within respective predetermined ranges.

Figure 13:
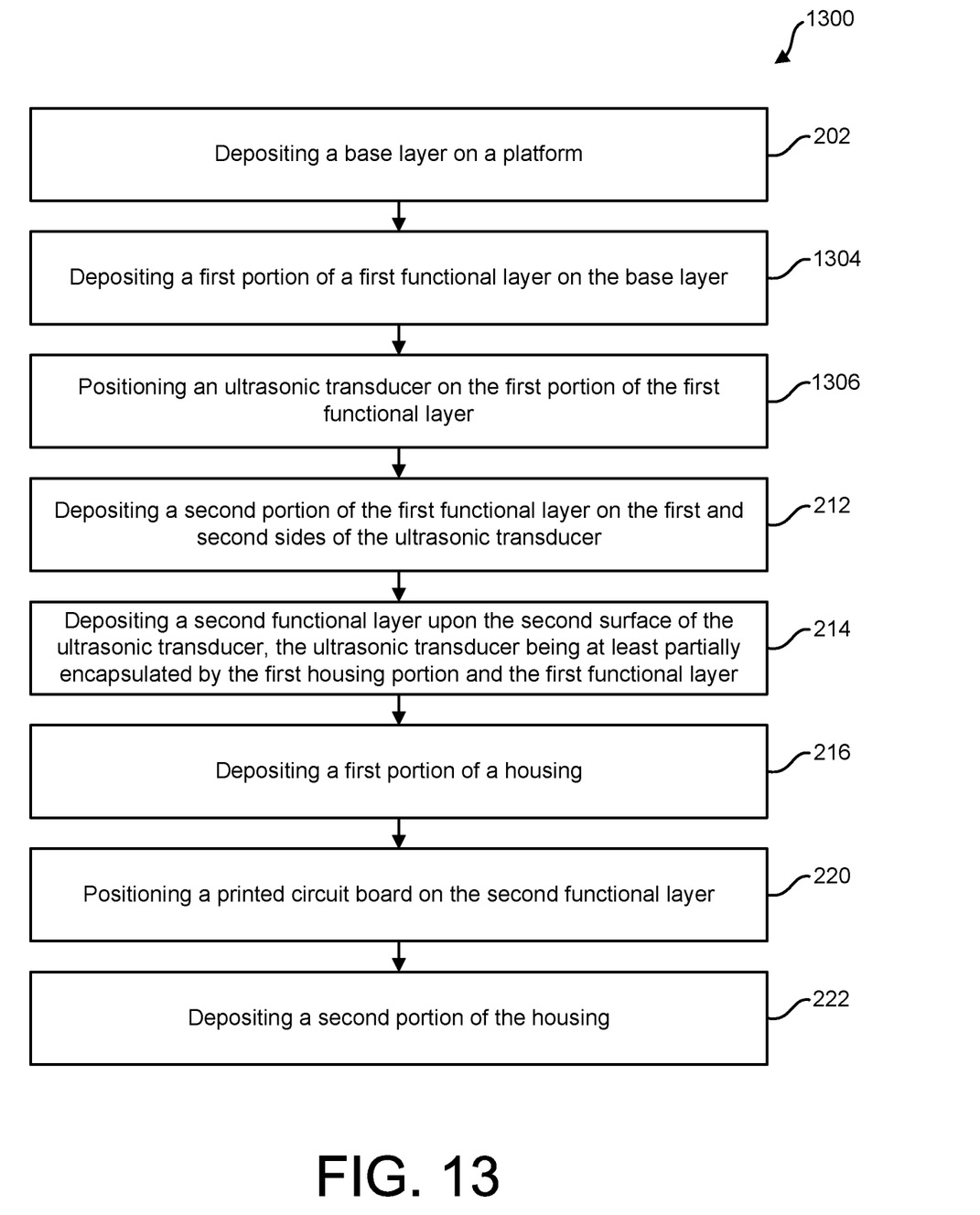
FIG. 13 is flow diagram illustrating another embodiment of a method of forming an ultrasonic probe by three-dimensional (3D) deposition.

In one aspect of the method 200, labeled method 1300 in FIG. 13, the flipping operation 210 can be omitted. As shown in FIG. 13, following deposition of the base layer 300, in operation 202, the first portion of the first functional layer 500a can be deposited on the base layer 300 in operation 1304. Subsequently, in operation 1306, a desired surface (e.g., first or second surface 400a, 400b) of the transducer 400 can be positioned on the first portion of the first functional layer 500a. The remaining operations of the method 1300 can include operations 212-222, as discussed above.

Exemplary technical effects of the methods, systems, and devices described herein include, by way of non-limiting example three-dimensional fabrication of ultrasonic probes by additive manufacturing (e.g., stereolithography). In one aspect, material layers (e.g., functional material layers) can be deposited directly on the ultrasonic transducer. This direct deposition can avoid the need for time consuming manual assembly. Furthermore, by reducing the amount of manual assembly, manufacturing variations can be reduced. In additional aspects, functional layers can be tailored to their intended application.

Certain exemplary embodiments have been described to provide an overall understanding of the principles of the structure, function, manufacture, and use of the systems, devices, and methods disclosed herein. One or more examples of these embodiments have been illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

The subject matter described herein can be implemented in analog electronic circuitry, digital electronic circuitry, and/or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

Approximating language, as used herein throughout the specification and claims, may be applied to modify any quantitative representation that could permissibly vary without resulting in a change in the basic function to which it is related. "Approximately," "substantially, or "about" can include numbers that fall within a range of 1%, or in some embodiments within a range of 5% of a number, or in some embodiments within a range of 10% of a number in either direction (greater than or less than the number) unless otherwise stated or otherwise evident from the context (except where such number would impermissibly exceed 100% of a possible value). Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

One skilled in the art will appreciate further features and advantages of the invention based on the above-described embodiments. Accordingly, the present application is not to be limited by what has been particularly shown and described, except as indicated by the appended claims. All publications and references cited herein are expressly incorporated by reference in their entirety.

What is claimed is:

1. A method of manufacturing an ultrasonic probe, comprising:
    printing a base layer on a platform;
    printing a first portion of a first functional layer on the base layer;
    positioning a first surface of an ultrasonic transducer on the first portion of the first functional layer, the ultrasonic transducer further including a second surface opposite the first surface and opposed first and second sides, the first and second sides being transverse to the first and second surfaces;
    printing a second portion of the first functional layer on the first and second sides of the ultrasonic transducer, the second portion of the first functional layer printed such that it extends along the first and second sides from the first portion of the first functional layer to the second surface; and
    printing a second functional layer upon the second portion of the first functional layer and second surface of the ultrasonic transducer, wherein the ultrasonic transducer is encapsulated by the first functional layer and the second functional layer.

2. The method of claim 1, wherein printing the base layer comprises:
    submerging the platform within a tank containing a liquid resin of a base material;
    focusing a first light beam within a volume of the base material resin adjacent to a surface of the platform; and
    curing the volume of base material resin in response to exposure to the first light beam to form the base layer.

3. The method of claim 2, wherein printing the first portion of the first functional layer comprises:
    submerging the platform and the base layer within the tank containing a liquid resin of a first functional material;
    focusing a second light beam within a first volume of the first functional material adjacent to a surface of the base layer; and
    curing the first volume of the first functional material resin in response to exposure to second light beam to form the first portion of the first functional layer.

4. The method of claim 3, wherein printing the second portion of the first functional layer comprises:
    submerging the platform, the base layer, the ultrasonic transducer, and the first portion of the first functional layer within the tank containing a liquid resin of the first functional material;
    focusing the second light beam within a second volume of the first functional material adjacent to the first and second sides of the transducer; and
    curing the second volume of the first functional material resin in response to exposure to the second light beam to form the second portion of the first functional layer.

5. The method of claim 4, wherein printing the second functional layer comprises:
    submerging the platform, the base layer, the ultrasonic transducer, and the first and second portions of the first functional layer within the tank containing a liquid resin of the second functional material;

focusing a third light beam within a third volume of the second functional material adjacent to the second surface of the transducer; and curing the third volume of the second functional material resin in response to exposure to the fourth light beam to form the second functional layer on the second surface of the transducer.

6. The method of claim 1, further comprising printing a first portion of a housing on at least a portion of free surfaces of the base layer, the ultrasonic transducer, and the first and second functional layers.

7. The method of claim 6, wherein printing a first housing portion comprises:

submerging the platform, the base layer, the ultrasonic transducer, and the first and second portions of the first functional layer within the tank containing a liquid resin of a housing material;

focusing a fourth light beam within a first volume of the housing material adjacent to at least a portion of free surfaces of the base layer, the ultrasonic transducer, and the first and second functional layers; and curing the first volume of the housing material in response to exposure to the fourth light beam to form the first housing portion.

8. The method of claim 6, further comprising:

positioning a printed circuit board (PCB) on the second functional layer; and electrically connecting the PCB to the ultrasonic transducer.

9. The method of claim 8, further comprising further comprising printing a second housing portion on at least a portion of the base layer, the first and second functional layers, the transducer, the first housing portion, and the PCB.

10. The method of claim 9, wherein printing the second housing portion comprises:

submerging the platform, the base layer, the ultrasonic transducer, the first and second functional layers, the PCB, and the first housing portion within the tank containing the liquid resin of the housing material;

focusing the fourth light beam within a second volume of the housing material resin adjacent to free surfaces of the base layer, the ultrasonic transducer, the first and second functional layers, the PCB, and the first housing portion; and curing the housing material resin in response to exposure to the fourth light to form the second housing portion.

11. The method of claim 10, wherein the PCB is encapsulated by the first housing portion and the second housing portion.

12. The method of claim 1, wherein the first functional material comprises an acoustic matching material configured to provide acoustic impedance matching between the ultrasonic transducer and a target.

13. The method of claim 1, wherein the second functional material comprises a damping material configured to attenuate ultrasonic signals emitted by the ultrasonic transducer by a predetermined amount.

14. The method of claim 8, wherein electrically connecting the PCB to the ultrasonic transducer comprises printing one or more electrically conductive pathways between the ultrasonic transducer and the PCB prior to printing the second housing portion.

* * * * *